United States Patent [19]

Solanki

[11] Patent Number: 4,899,321

[45] Date of Patent: Feb. 6, 1990

[54] METHOD AND APPARATUS FOR DETERMINING THE SOURCE SIGNATURE OF LAND VIBRATORS

[75] Inventor: J. J. Solanki, Plano, Tex.

[73] Assignee: Mobil Oil Corporation, New York, N.Y.

[21] Appl. No.: 290,133

[22] Filed: Dec. 27, 1988

[51] Int. Cl.[4] .............................................. G01V 1/28
[52] U.S. Cl. ........................................ 367/48; 367/39;
  367/41; 367/189
[58] Field of Search ...................... 367/39, 41, 48, 189,
  367/190; 364/421

[56] References Cited

U.S. PATENT DOCUMENTS 4,646,274 2/1987 Martinez ................................ 367/41
4,692,912 9/1987 Mueller et al. ....................... 367/190
4,782,446 11/1988 Ehler et al. ............................ 367/41

FOREIGN PATENT DOCUMENTS 2190746A 11/1987 United Kingdom .

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

Methods and apparatus for processing vibrative seismic data. Baseplate phaselock vibrative energy, reaction mass phaselock vibrative energy and ground force phaselock vibrative energy are transmitted into the earth using a land vibrator and the reflections of the transmitted waves recorded. The source signature of the land vibrator is computed for each type of vibrative energy and the source signature is correlated with the corresponding recorded data to produce an image of the subsurface. Regardless of the type of phaselock vibrative energy generated into the subsurface, the images of the subsurface produced by the correlation of the source signature and the recorded data are substantially the same. The correlated data may be then analyzed to yield useful information related to the characteristics of the subsurface.

6 Claims, 19 Drawing Sheets

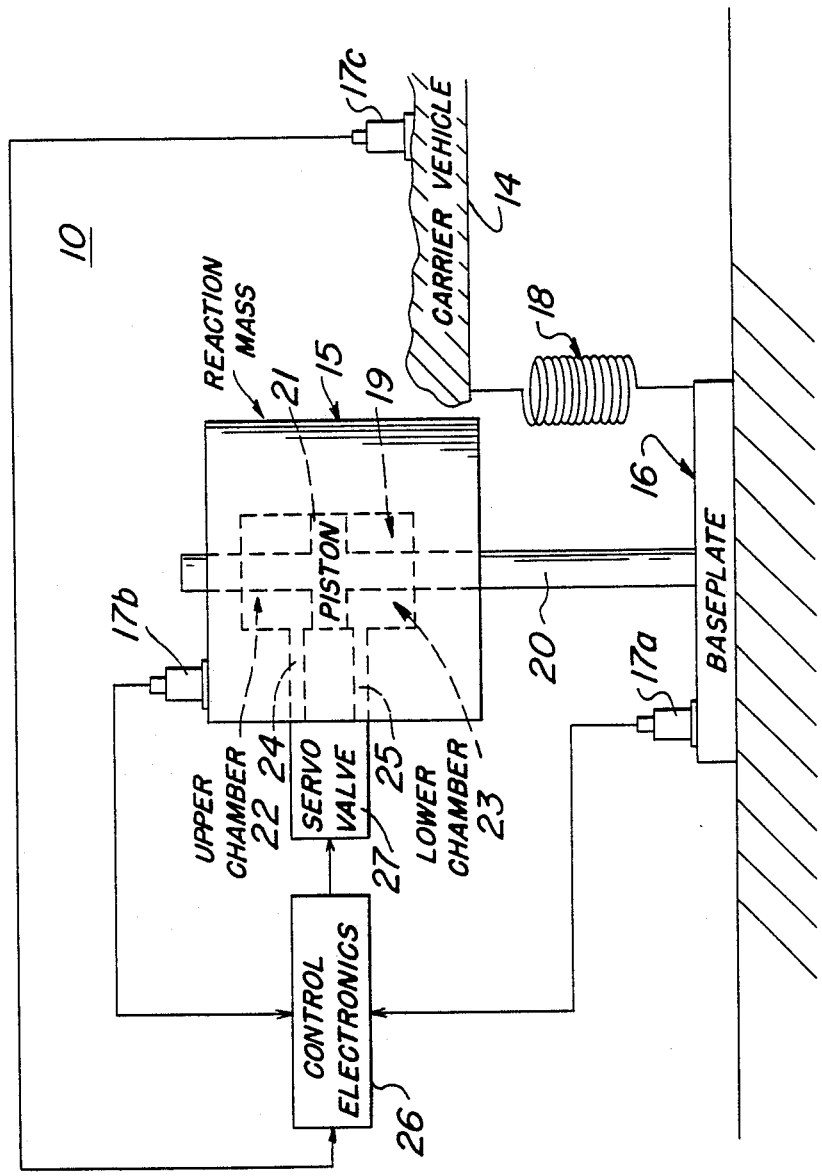

FIG. 4C
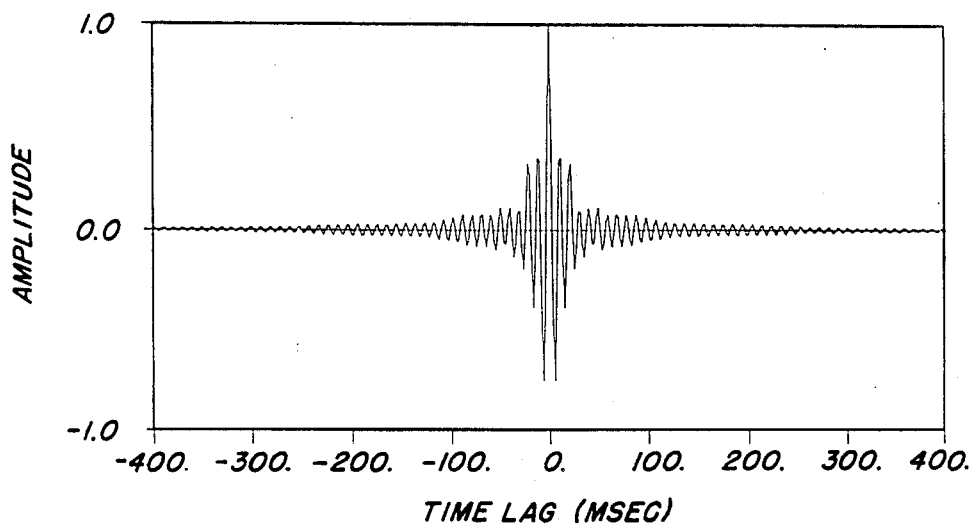
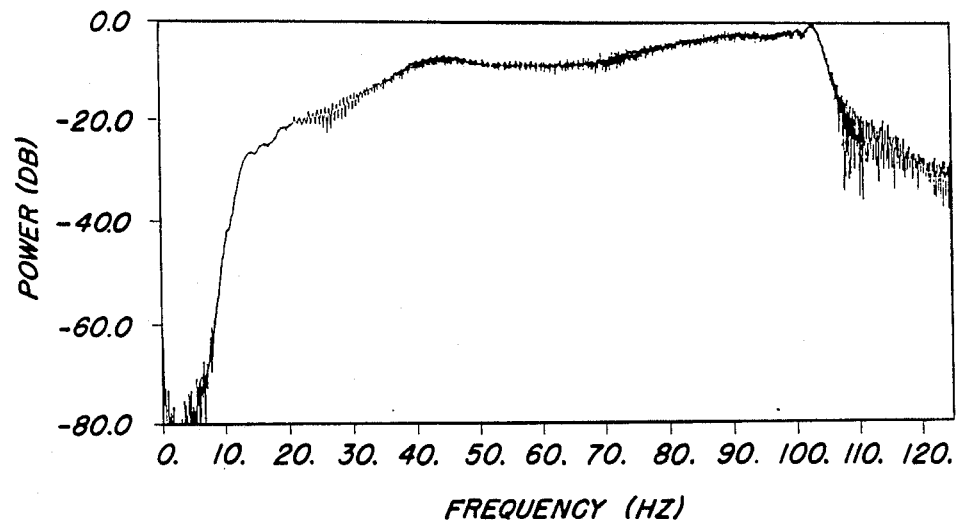
FIG. 4D

FIG. 5A
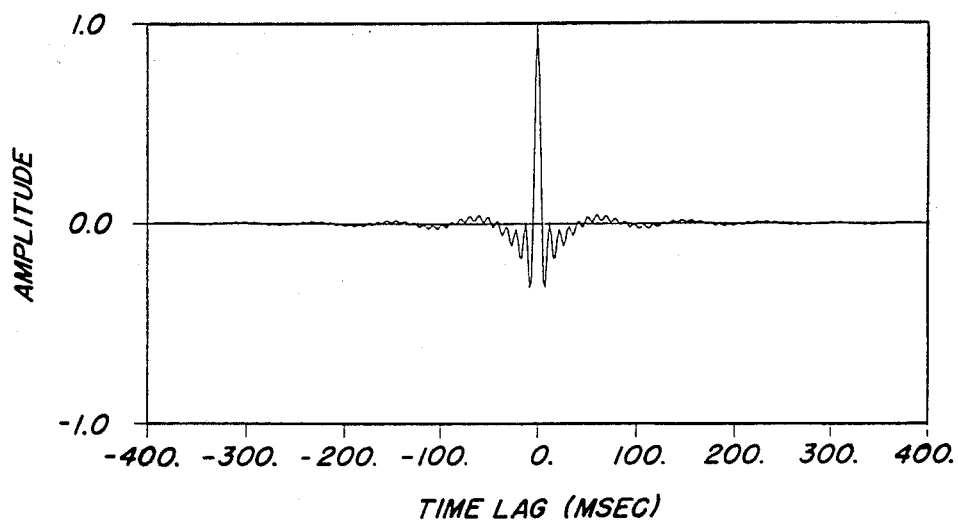
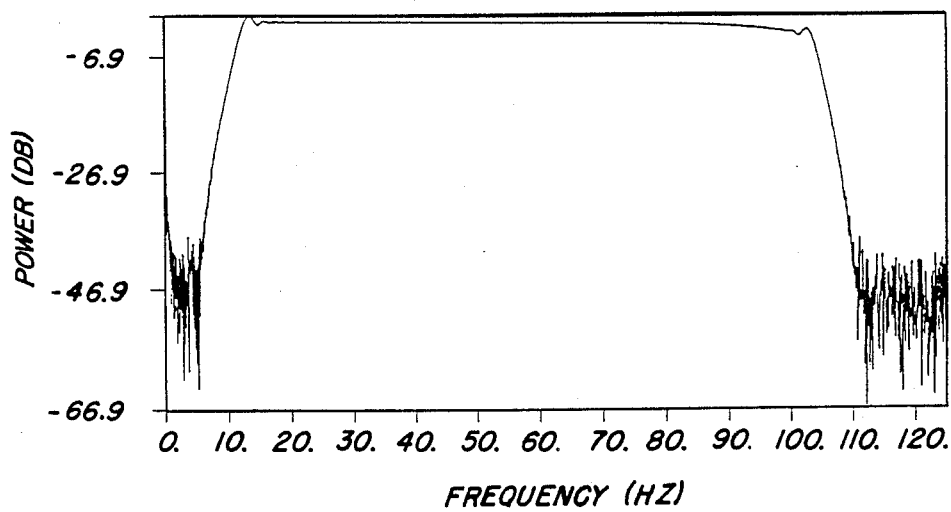
FIG. 5B

METHOD AND APPARATUS FOR DETERMINING THE SOURCE SIGNATURE OF LAND VIBRATORS

BACKGROUND OF THE INVENTION

This invention is related to a method and apparatus for processing seismic data to produce an image of the subsurface. More particularly, this invention is related to a method and apparatus for determining the source signature of a land vibrator which generates phase locked seismic energy into the subsurface such that regardless of whether the vibrator is phase locked to the baseplate, reaction mass or ground force, the correlation of the source signature and seismic data acquired by recording the reflections of the phase locked seismic energy will produce images of the subsurface which are substantially the same.

Numerous techniques for exploring the earth to acquire seismic data are well known. One well known technique utilizes a land vibrator for generating vertically-oriented seismic energy into the earth. A land vibrator transmits a frequency modulated signal into the medium being explored. The transmitted signal is reflected off subsurface reflecting interfaces and directed towards the surface for detection by geophones positioned on the surface. As the reflections so recorded are caused by a seismic source activated at a known time and location, the recorded data can be processed by a computer in known ways to produce an image of the subsurface. The image thus produced is commonly interpreted by geophysicists to detect the possible presence of valuable hydrocarbons.

A second well known technique also utilizes a land vibrator for generating vertically-oriented seismic energy into the earth. Here, the generated energy is reflected off subsurface reflecting interfaces and detected by a geophone located in a borehole. Preferably, the source should be placed such that the subsurface reflection points generally lie in the plane containing the borehole and the source location. The geophone would then be moved to a new location for a next shot with the distance between geophone locations being some constant distance such as 50 feet. See, for example, U.S. Pat. No. 4,627,036 issued to Wyatt and U.S. Pat. No. 4,597,464 issued to Chelminski.

In operating vibrator exploration systems, it is important to ensure that the energy imparted into the ground is in phase with the reference signal. Several different types of phase locking are known in the art——baseplate (or "BP") phase locking, reaction mass (or "RM") phase locking, ground force (or "GF") phase locking and ground force phase locking with amplitude control. Traditionally, baseplate phase locking whereby the signal generated by the baseplate of a vibratory seismic source imparting seismic energy into the ground is maintained in phase with the reference signal (also referred to as the "filtered pilot sweep" or "FPS") being supplied to the vibratory seismic source, has been selected for use in vibratory exploration systems. For example, see U.S. Pat. No. 3,979,715 issued to Hufstedler et al.

After reference signal/vibrator phase lock was ensured, the recorded seismic traces were then correlated with the filtered pilot sweep, or "FPS", utilizing well known seismic processing methods. Assuming that the transfer function of the geophone and the medium could be ignored, the resultant correlated traces were expected to be a zero phase wavelet. Inconsistencies in the resultant correlated wavelets, however, led to recent challenges to this traditional method of seismic processing.

To avoid inconsistencies in the correlated wavelets produced by such methods, W. E. Lerwill, "The Amplitude and Phase Response of a Seismic Vibrator", *Geophysical Prospecting*, Vol. 29, 1981, pp. 503–528 recommended phase locking between the filtered pilot sweep and the reaction mass acceleration when conducting vibrative exploration. J. J. Sallas, "Seismic Vibrator Control and the Downgoing P-Wave", *Geophysics*, Vol. 49, June 1984, pp. 732–40, on the other hand, recommended locking the phase of the FPS to the phase of the negative ground force. Still another type of phase locking was recommended by Joseph K. Schrodt, "Techniques for Improving Vibroseis Data", *Geophysics*, Vol. 52, April 1987, pp. 469–82. There, it was recommended that phase locking the FPS to ground force, along with amplitude control, would provide a more stable downgoing wavelet than phase locking to baseplate or reaction mass acceleration.

Each of the various proposed phase locking methods, however, tended to produce correlated seismic data inconsistent with the correlated seismic data produced by the other proposed phase locking methods. Despite corresponding to the same subsurface reflection points, data acquired using different phase locking techniques generally produced correlated seismic data indicative of differing subsurface characteristics. The information related to the subsurface which could be derived from the acquired seismic varied, therefore, depending on the phase locking technique selected prior to commencing vibrative exploration.

SUMMARY OF THE INVENTION

It is an object of this invention to determine the source signature of a land vibrator.

It is another object of this invention to correlate seismic data acquired by recording the reflections of phase-locked vibrative energy generated into the subsurface with the source signature of the land vibrator during generation of the phaselocked vibrative energy to produce a zero phase wavelet imaging the subsurface.

It is still another object of this invention that correlations of seismic data acquired by recording the reflections of phaselocked vibrative energy generated into the earth and the source signature of the land vibrator will produce essentially the same image of the subsurface regardless of the type of phaselocking utilized.

A frequency modulated output signal of a land vibrator is modified until locked in phase with a signal indicative of the motion of the baseplate portion of the land vibrator. Vibrative energy characterized by the modified frequency modulated signal is transmitted into the earth via the motion of the land vibrator baseplate. The generated phaselocked vibrative energy is reflected off subsurface reflecting interfaces and directed towards the surface where the reflections are detected by geophones and recorded.

The baseplate acceleration and the reaction mass acceleration are determined during the respective generation of baseplate phase lock vibrative energy, reaction mass phase lock vibrative energy and ground force phase lock vibrative energy into the subsurface by accelerometers positioned on the baseplate and reaction mass. The force on the ground exerted by the land vibrator for each type of vibrative energy is then computed. The computed ground force for each type of vibrative energy is correlated with the corresponding acquired seismic data to produce correlated data in the form of a zero phase wavelet imaging the subsurface. Images of the subsurface that are substantially the same are thereby produced, irrespective of the type of phaselocked vibrative energy generated into the subsurface. The produced correlated data may then be utilized to derive useful information related to the characteristics of the subsurface such as phase information.

The above and other objects, advantages and features of the invention will be more readily understood from the following detailed description of the invention, which is provided in connection with the accompanying drawings.

BRIEF DESCRIPTION OF THE DRAWINGS

FIG. 2 illustrates a land vibrator for generating vibrative seismic energy into the earth;

FIGS. 4c–d illustrate the autocorrelation and power spectrum of the baseplate of the land vibrator during the generation of ground force phaselocked vibrative energy;

FIGS. 5a–b illustrate the autocorrelation and power spectrum of the filtered pilot sweep supplied to the land vibrator during the generation of baseplate phaselocked vibrative energy;

DESCRIPTION OF THE INVENTION

Figure 1:
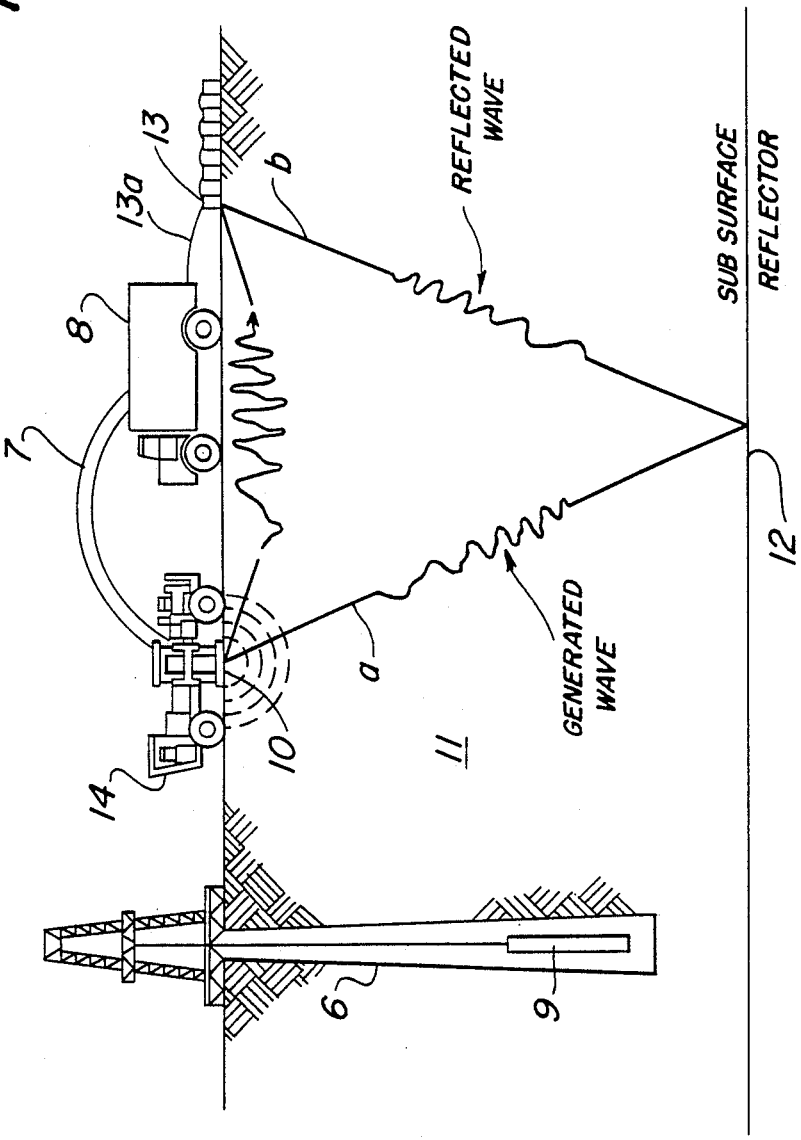
FIG. 1 illustrates a vibrative exploration system.

Referring first to FIG. 1, a conventional vibratory exploration system may be seen. A frequency-modulated, sinusoidal, sweep or control signal is transmitted from truck 8 via line 7 to vibrator 10 mounted on carrier vehicle 14. Line 7 also transmits acceleration signals as to be more fully described later, from vibrator 10 to truck 8 for recording by recording means (not shown). Vibrator 10, which is hydraulically driven and controlled by the transmitted electrical signal, exerts a quasi-sinusoidal force of many tons on the ground surface to generate vertically orientated seismic waves. The peak force generated by vibrator 10 is limited by the weight holding the vibrator in contact with the earth. An electrical feedback system to be described in more detail with respect to FIG. 2 keeps the ground motion in unison with one of a plural number of control signals.

Seismic waves generated from vibrator 10 propagate through subsurface 11. Seismic waves which travel directly to seismometer 13 without reflection are known as direct waves. Other seismic waves propagate into subsurface 11 where they may be reflected by subsurface interfaces and the reflections detected by seismometer 13. One such wave is illustrated in FIG. 1 where a seismic wave generated by vibrator 10 propagates through subsurface 11 along path "a", until reflected by reflector 12. The reflection travels along path "b" and is detected by seismometer 13. Signals detected by seismometer 13 are transmitted via line 13a to truck 8 for recording by the same recording means and/or display. The detected signals are uncorrelated superpositions of long wave trains arriving at different times and do not resemble a normal seismogram.

In the seismic exploration system illustrated in FIG. 1, provision is also made for conducting VSP exploration of the earth as well. To conduct VSP exploration, geophone 9 is positioned in borehole 6. Seismic energy is propagated by vibrator 10 into the subsurface medium. The generated energy is reflected by subsurface reflecting interfaces such as reflector 12 and detected by geophone 9. The detected seismic energy would be transmitted via a line (not shown) to truck 8 for recording by the same recording means and/or display. The geophone would next be moved to a new location and additional seismic energy generated.

Turning next to FIG. 2, seismic vibrator 10 may now be seen in greater detail. Vibrator 10 transmits force to ground 11 via a reaction mass 15——baseplate 16 configuration. Baseplate 16 is held against the earth's surface by a hold down weight typically comprising a vibrator carrier vehicle 14 in which vibrator 10 is mounted. Isolating springs 18 mounted between baseplate 16 and carrier vehicle 14 to isolate the baseplate from carrier vehicle. Reaction mass 15, which has a mass $m_R$, is positioned directly above baseplate 16 and has an internal cylinder 19 formed therein. The lower end of a vertically extending piston rod 20 is anchored to baseplate 16 by conventional means and extends upward through cylinder 19 where the upper end of piston rod 20 is slideably received in chamber 19. The upper end of rod 20 has formed thereon a piston 21 which divides cylinder 19 into upper and lower chambers 22 and 23, respectively. Upper and lower chambers 22 and 23 open outwardly through reaction mass 15 via ports 24 and 25 respectively.

Piston 21 is caused to vertically reciprocate within cylinder 19 by means of control electronics 26. Control electronics 26 controls servo valve 27 which receives high pressure hydraulic fluid from a hydraulic fluid supply (not illustrated in FIG. 2). Control electronics 26 receives information from accelerometers 17a-c positioned on baseplate 16, reaction mass 15 and carrier vehicle 14, respectively, and generates a generally sinusoidal driving signal to servo valve 27. The received signal causes valve 27 to alternately force pressurized hydraulic fluid, via ports 24 and 25, into upper and lower cylinder chambers 22 and 23. The oscillatory supply of pressurized hydraulic fluid to cylinder 19 causes piston 21, and therefore baseplate 16 to vertically oscillate in a nearly sinusoidal fashion.

Figure 3A:
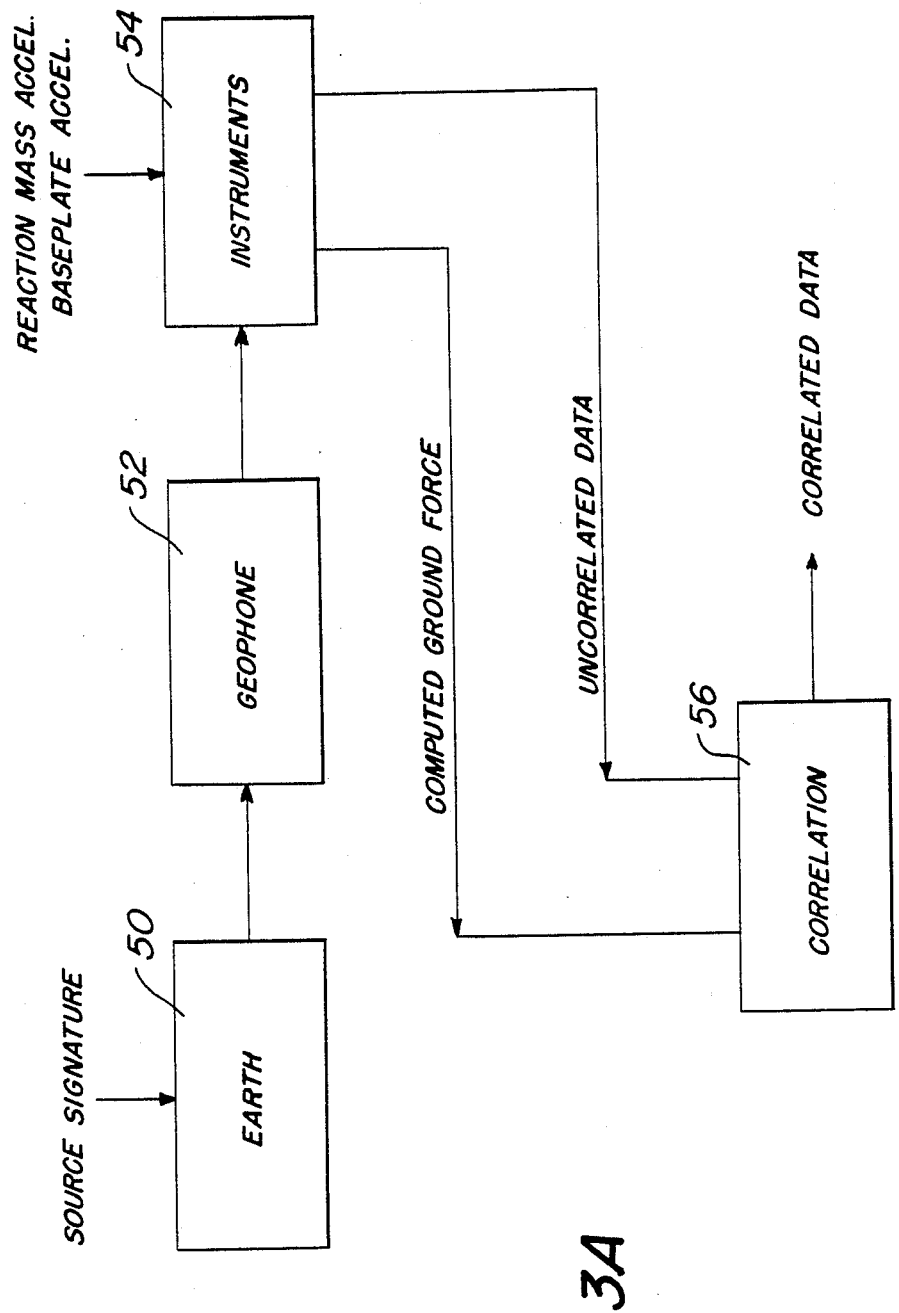
FIG. 3a illustrates, in flow chart form, the method of acquiring and processing vibrative seismic data of the present invention.

Turning next to FIG. 3a, the method of acquiring and processing vibrative seismic data in accordance with the teachings of the present invention is now described. Phaselocked vibrative energy characterized by a source signature is generated into earth 50. Reflections of the generated vibrative energy are detected by geophones 52 and supplied to instruments 54 for recording. Also supplied to instruments 54 for recording are the reaction mass acceleration and the baseplate acceleration of the land vibrator. From the supplied data, instruments 54 determine the computed ground force. The computed ground force and the uncorrelated seismic data recorded by instruments 54 are then supplied to correlation means 56 for correlation. Correlated data is then output by correlation means 56 for display or analysis.

Figure 3B:
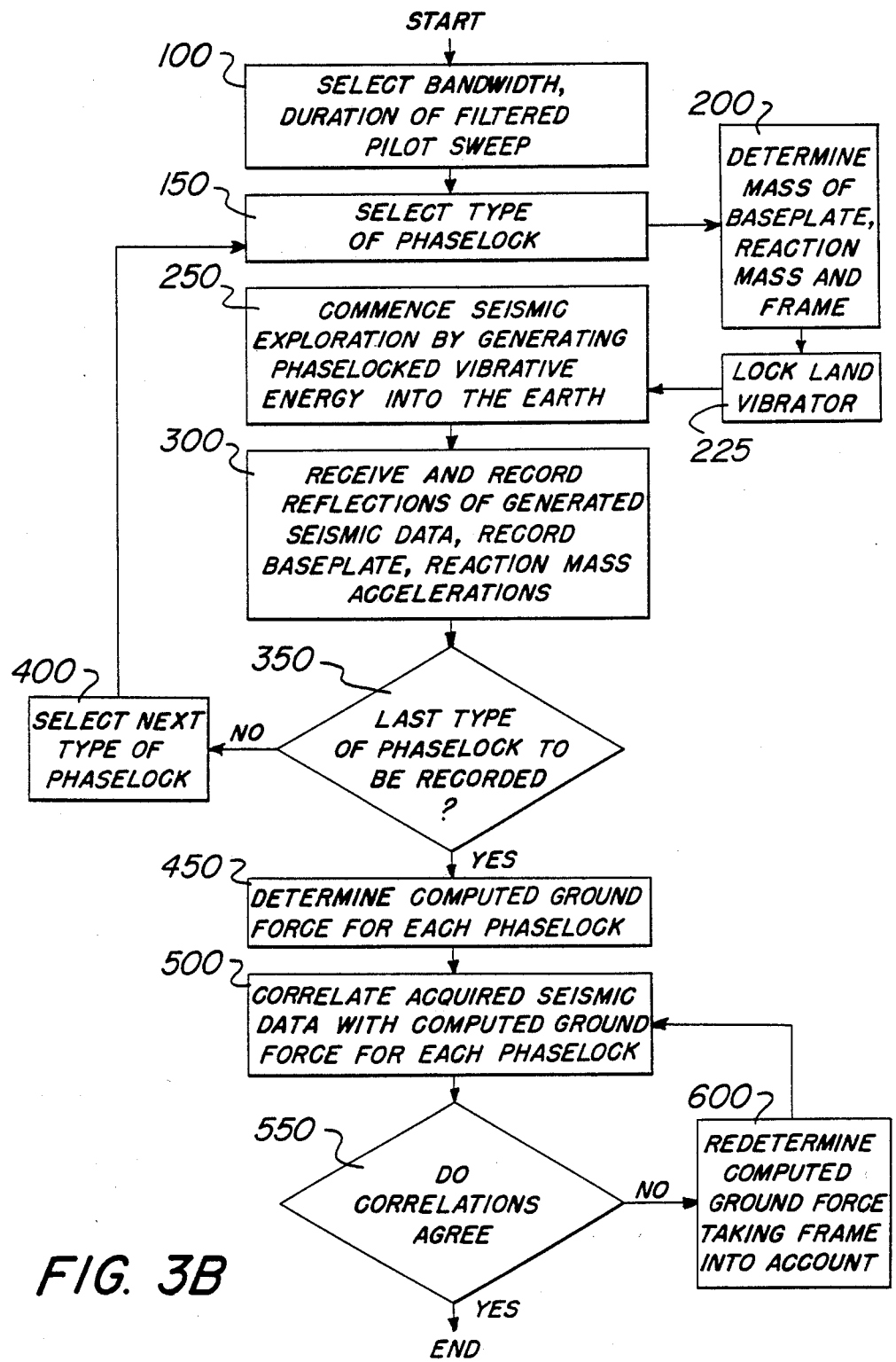
FIG. 3b illustrates, in flow chart form, the method of acquiring and processing vibrative seismic data set forth in FIG. 3a in greater detail.
Figure 4A:
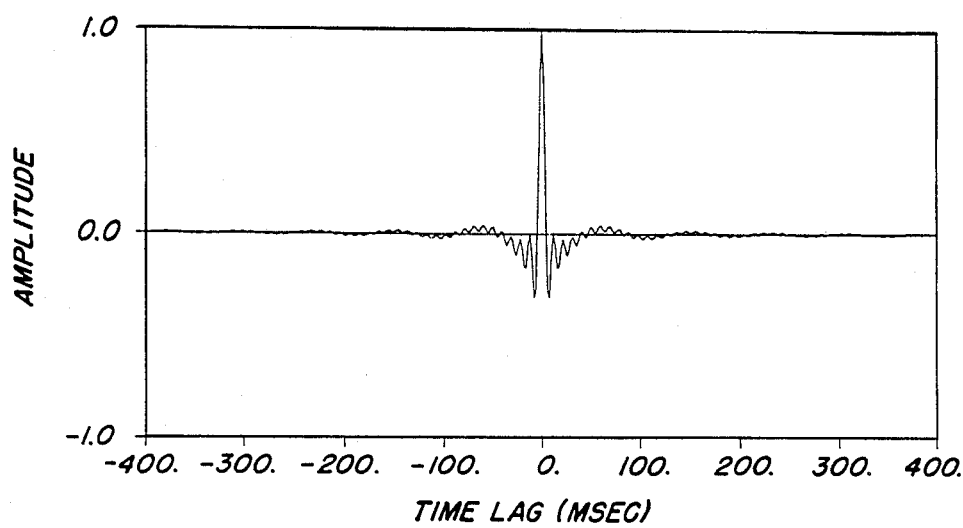
FIGS. 4a–b illustrate the autocorrelation and power spectrum of the filtered pilot sweep supplied to the land vibrator during the generation of ground force phaselocked vibrative energy.
Figure 4B:
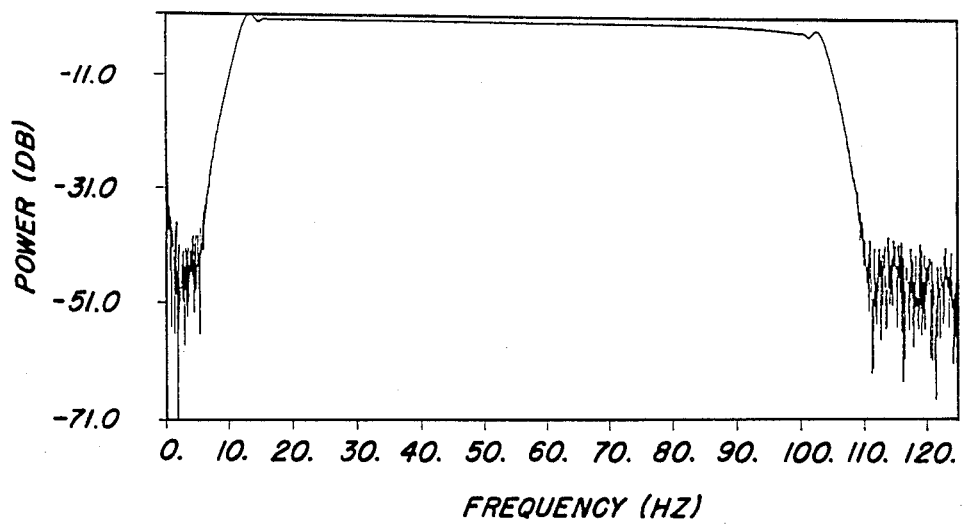
Figure 4E:
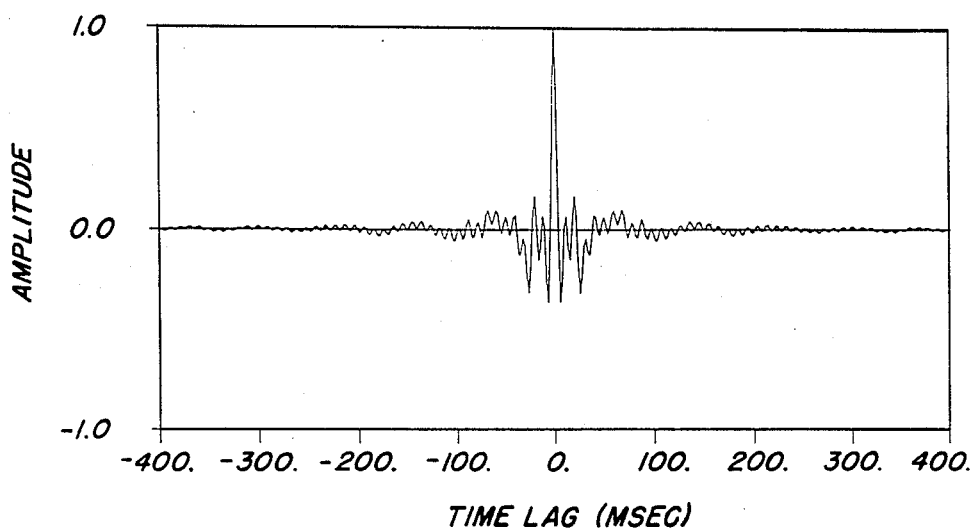
FIGS. 4e–f illustrate the autocorrelation and power spectrum of the reaction mass of the land vibrator during the generation of ground force phaselocked vibrative energy.
Figure 4F:
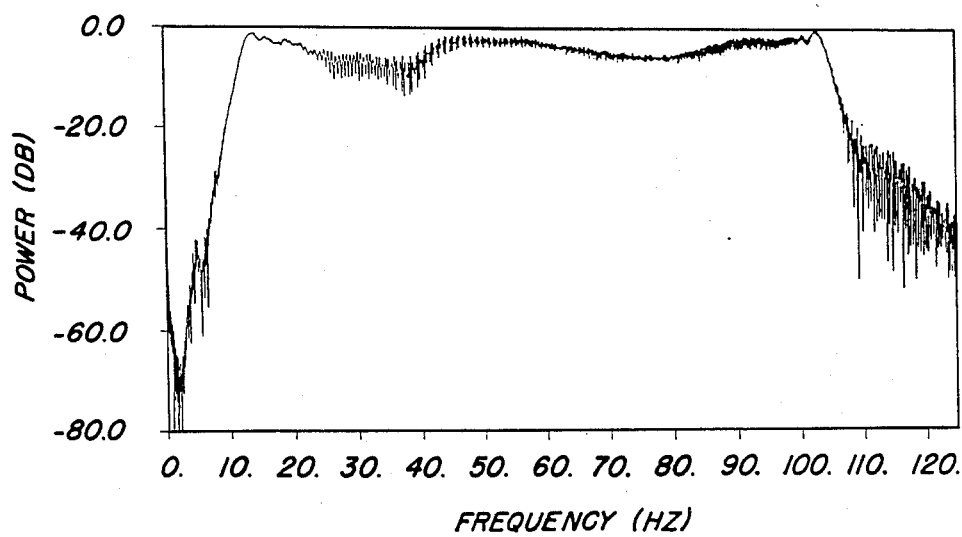
Figure 4G:
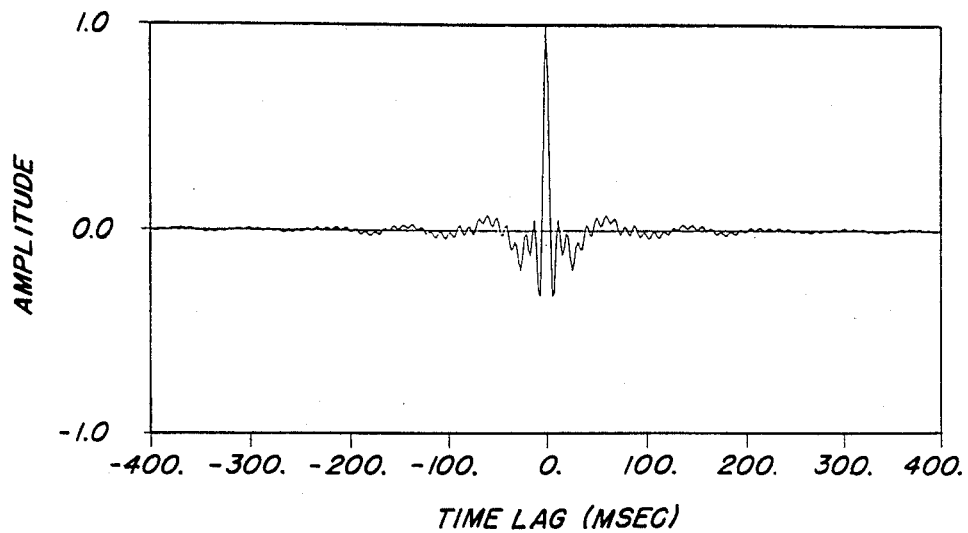
FIGS. 4g–h illustrate the autocorrelation and power spectrum of the computed ground force during the generation of ground force phaselocked vibrative energy.
Figure 4H:
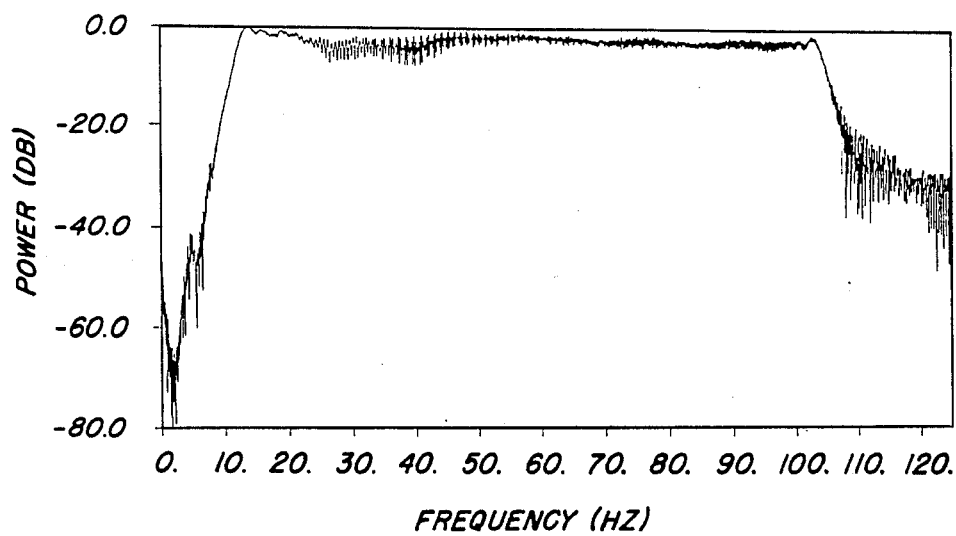
Figure 5C:
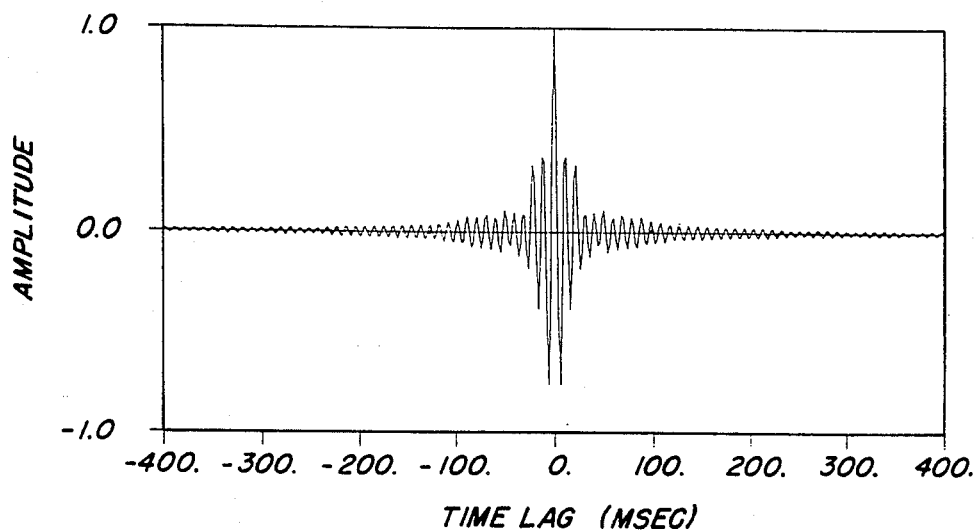
FIGS. 5c–d illustrate the autocorrelation and power spectrum of the baseplate of the land vibrator during the generation of baseplate phaselocked vibrative energy.
Figure 5D:
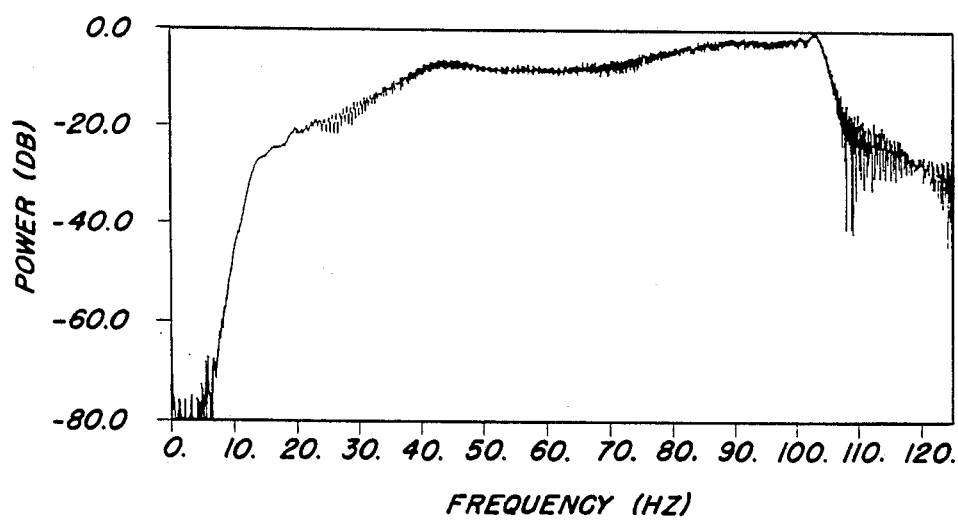
Figure 5E:
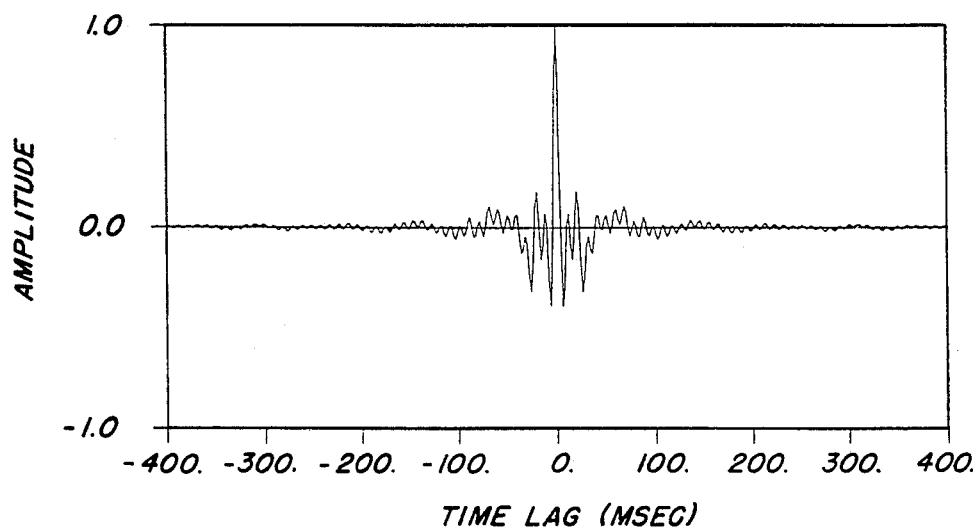
FIGS. 5e–f illustrate the autocorrelation and power spectrum of the reaction mass of the land vibrator during the generation of baseplate phaselocked vibrative energy.
Figure 5F:
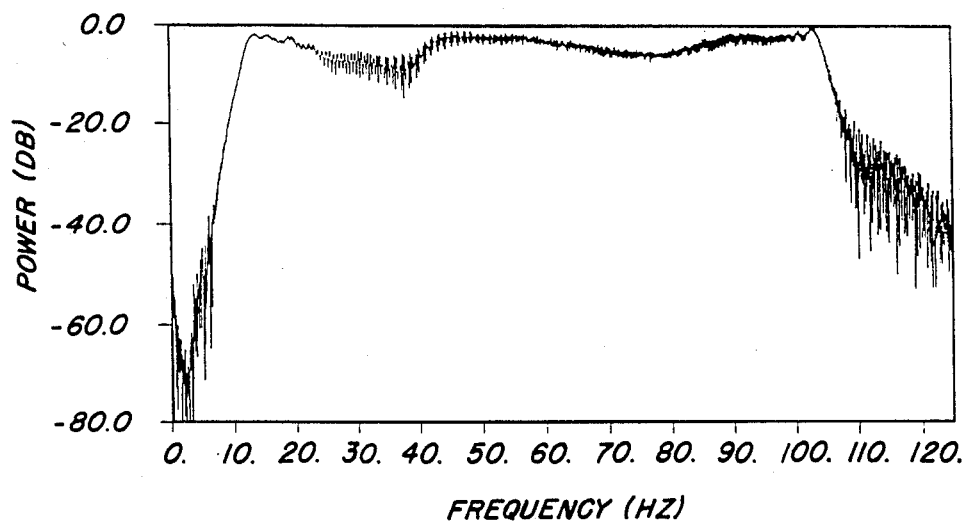
Figure 5G:
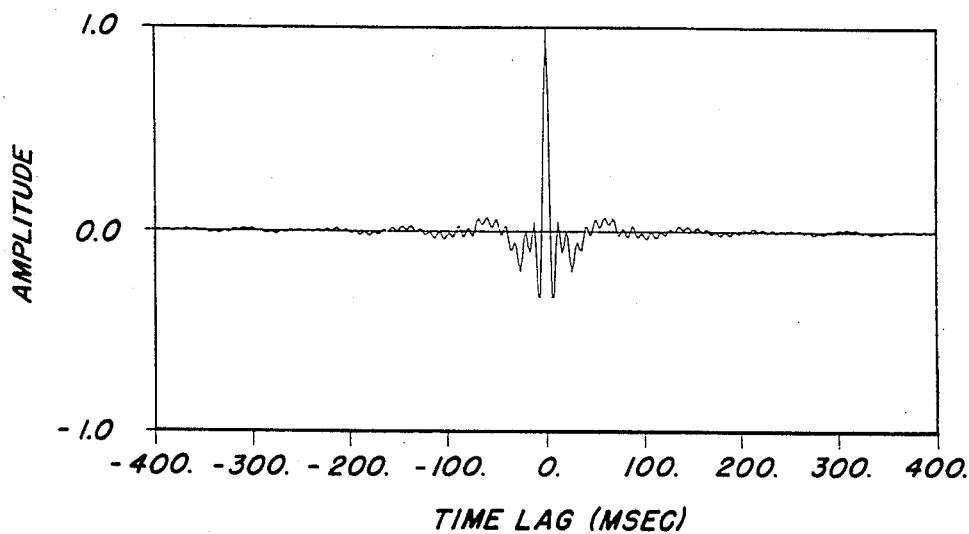
FIGS. 5g–h illustrate the autocorrelation and power spectrum of the computed ground force during the generation of baseplate phaselocked vibrative energy.
Figure 5H:
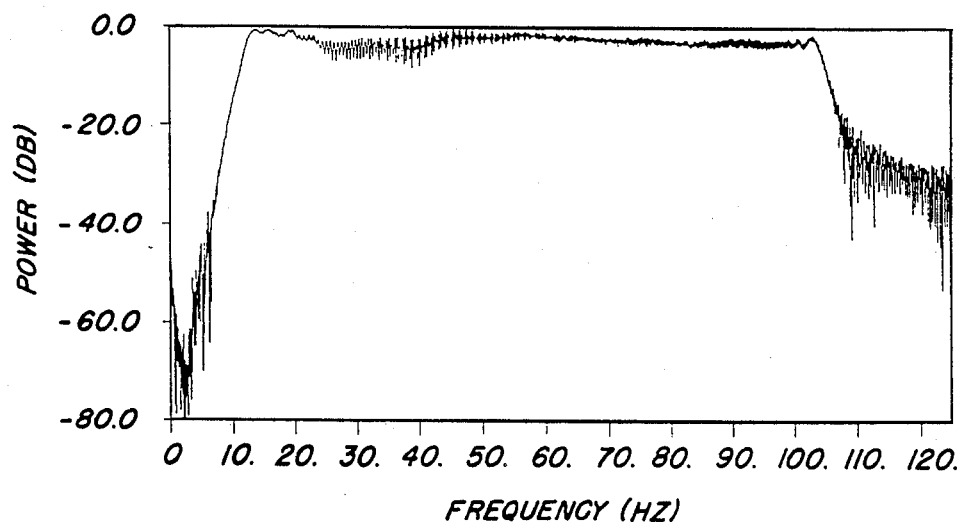
Figure 6A:
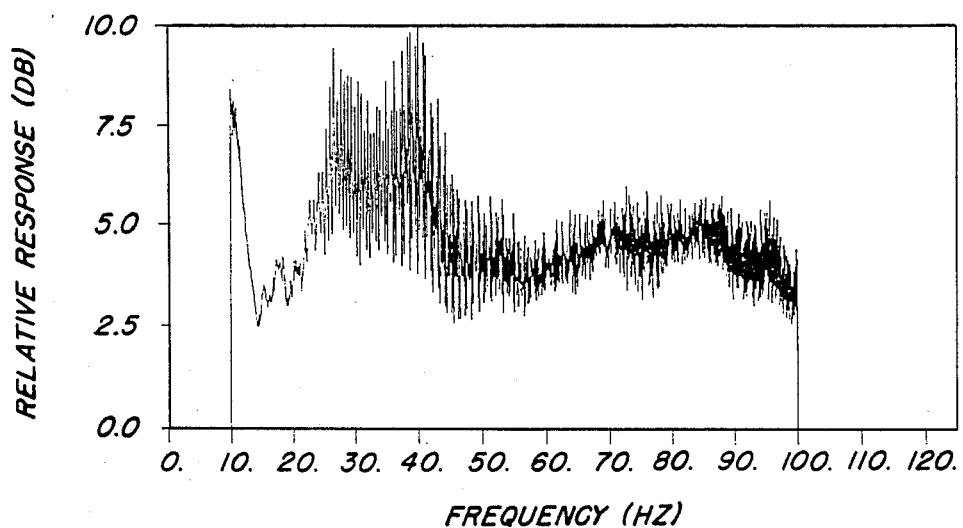
FIGS. 6a–b illustrate the ratio of power spectra and phase difference of the filtered pilot sweep and the computed ground force during the generation of ground force phaselocked vibrative energy.
Figure 6B:
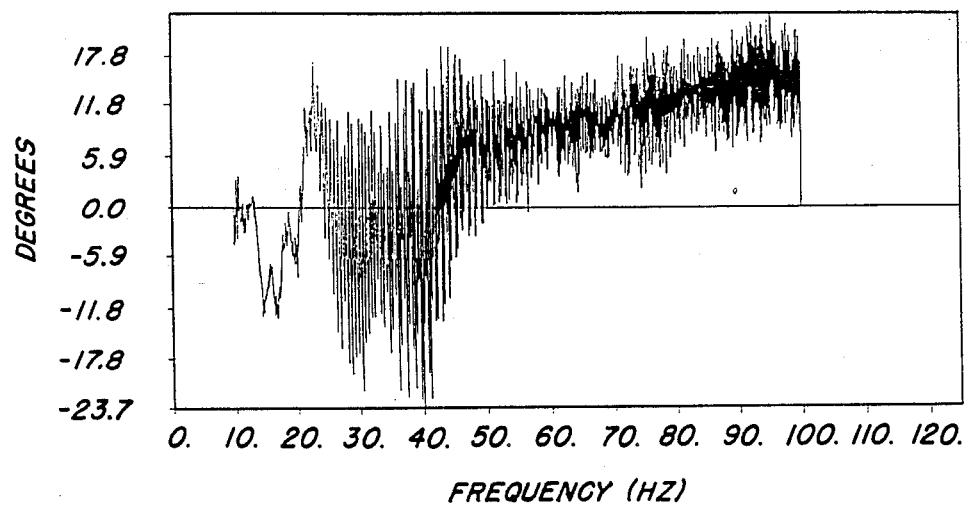
Figure 6C:
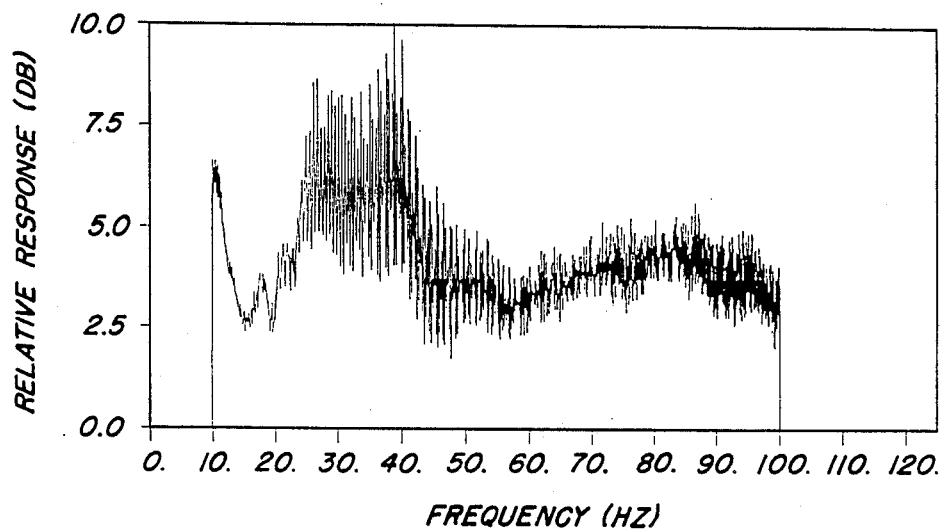
FIGS. 6c–d illustrate the ratio of power spectra and phase difference of the filtered pilot sweep and the computed ground force during the generation of baseplate phaselocked vibrative energy.
Figure 6D:
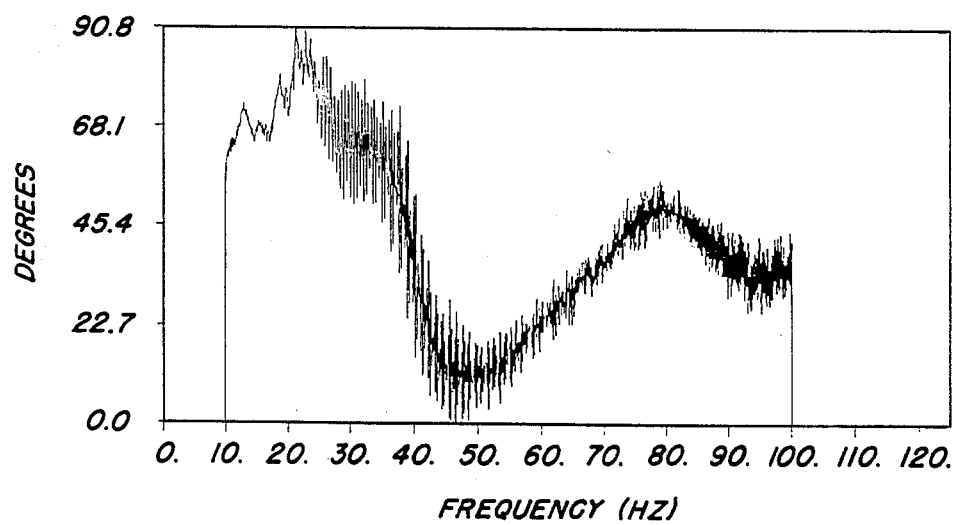

Turning next to FIG. 3b, the method of acquiring and processing vibrative seismic data set forth in FIG. 3a is now described in greater detail. Commencing at step 100, the desired bandwidth and sweep duration of the oscillatory reference signal to be provided by control electronics 26 to servo valve 27 to control the motion of piston 21 is selected. At step 150, the type of phaselock to which vibrator 10 is to be locked is selected. The most well known of the numerous types of phaselocks are baseplate, reaction mass and ground force phaselock. Baseplate phaselock of vibrator 10 is achieved by adjusting the phase of the oscillatory signal supplied to servo valve 27 to be in phase with the oscillating motion of baseplate 16. To determine the oscillating motion of baseplate 16, accelerometer 17a is provided so that an electrical signal indicative of the acceleration of baseplate 16 is supplied to control electronics 26. The signal supplied to accelerometer 17c is then utilized to adjust the oscillatory signal supplied to serve valve 27 to keep vibrator 10 in sync with the motion of baseplate 16. The method of phaselocking land vibrator 10 to the motion of reaction mass 15 is very similar except that accelerometer 17b provides a signal related to the acceleration of reaction mass 15 to control electronics 26, again for adjusting the oscillatory signal supplied to servo valve 27 to keep the oscillatory motion of piston 21 in sync phase with the motion of reaction mass 15.

Phaselocking land vibrator 10 to the ground force utilizes the signal indicative of the acceleration of reaction mass 15 and the signal indicative of the acceleration of baseplate 16. Next, control electronics 26 produces a signal indicative of the force exerted by vibrator 10 on the ground from the two acceleration signals. The produced signal is then utilized to adjust the oscillatory signal supplied to servo valve 27 to keep vibrator 10 in phase with the ground force.

Proceeding to step 200, the mass of frame 14, reaction mass 15 and baseplate 16 is determined by conventional means and, at step 225, the land vibrator is locked to the desired type of phaselock in accordance with the methods described above by activating the land vibrator and utilizing the signals generated by accelerometers 17a and 17b to adjust the device until the desired phaselock is achieved.

Once land vibrator 10 has been phaselocked, the generation of phaselocked vibrative seismic energy to be utilized for seismic exploration commences at step 250 with the transmission of phaselocked vibrative energy into the subsurface where the transmitted waves are reflected by subsurface reflecting interfaces and detected by receivers such as geophones positioned on the surface.

Proceeding to step 300, the received reflections of the generated phaselocked vibrative seismic data are recorded using conventional means. Also at step 300, the baseplate, reaction mass and frame accelerations as determined by accelerometers 17a, 17b and 17c, respectively, are also recorded.

Proceeding to step 350, a determination is made whether seismic data has been recorded for all desired types of phaselocked vibrative data. If there are additional types of phaselocked vibrative data to be collected, a next type of phase lock is selected at step 400 and the method of the present invention returns to step 250 for additional data collection.

If seismic data has been recorded for all desired types of phaselock, the method proceeds to step 400 where the computed ground force is determined for each type of phaselock by utilizing the mass of the baseplate and reaction mass determined at step 200 as well as the baseplate and reaction mass accelerations recorded at step 300 for each type of phaselock.

More specifically, as the ground force exerted on the earth can be determined according to equation (1) below:

$$-F = m_{BP}x_{BP} + m_{RM}x_{RM} + m_{FR}x_{FR} \quad (1)$$

where:
$m_{BP}$ = mass of baseplate 15;
$x_{BP}$ = acceleration of baseplate 15;
$m_{RM}$ = mass of reaction mass 17;
$x_{BP}$ = acceleration of reaction mass 17;
$m_{FR}$ = mass of frame 14; and
$x_{FR}$ = acceleration of frame 14.

The contribution of the frame, i.e. carrier vehicle 14, to the ground force may be ignored assuming that isolating springs 18 separating baseplate 15 and carrier vehicle 14 are functioning optimally. This assumption simplifies the determination of the net force exerted on the contact area of the earth's surface to the vector sum of two components——the one due to the acceleration of baseplate 15 and the other due to the acceleration of reaction mass 17. Equation (1), therefore, may be simplified to the following:

$$-F \approx m_{BP} x_{BP} + m_{RM} x_{RM} \quad (2)$$

In the discussion to follow, this force is referred to as the computed ground force or "CGF".

Equations (1) and (2) assume, of course, that there is no decoupling between the earth's surface and baseplate 15. Decoupling would lead to the introduction of harmonics into the source signature and therefore in the seismic data. If downsweep is used, then these harmonic ghosts will appear before time zero after correlation and therefore would not be detrimental to my correlated results. If, however, a downsweep is used, then these harmonics ghosts will manifest themselves in the correlated data. If, however, the target depth and approximate velocity variation with depth, their influence can be avoided by lengthening the sweep time.

Proceeding to step 500, each acquired set of phaselocked seismic data is correlated with the computed ground force for that phaselock. Correlation is accomplished by applying well known convolution techniques to the acquired phaselocked data and the corresponding computed ground force. More specifically, as the convolutional model which represents the seismic trace as a convolution of the reflectivity with the source signature is represented according to Equation (3) below:

$$s(t) = r(t) * w(t) \quad (3)$$

where:
s(t) = the recorded seismic trace;
r(t) = the earth's reflectivity;
w(t) = the source signature; and
* = the convolutional operator.

Then, assuming that the source signature may be represented by the computed ground force, Equation (3) becomes:

$$s(t) = r(t) * (m_{BP} x_{BP} + m_{RM} x_{RM}) \quad (4)$$

or:

$$s(t) = (r(t) * m_{BP} x_{BP}) + (r(t) * m_{RM} x_{RM}) \quad (5)$$

As each set of phaselocked data is thus manipulated to produce an image of the same explored earth formation, each set of phaselocked data should produce very similar images of the explored formation. If upon a comparison of the images of the explored formation for different sets of phaselocked data are similar, then it is determined that the correlations agree and the method of processing phaselocked vibrative data ends. If the comparison indicates dissimilar images of the explored formation for different vibrator phaselocks, the correlations disagree and the method of processing phaselocked vibrative data continues at step 600.

As previously discussed, the frame's contribution to the resultant force on the earth is minimal for most cases. If a disagreement in the produced correlations for different types of phaselocked vibrative energy is identified at step 550, then the contribution of the frame to the computed ground force should be taken into account. A disagreement in the correlations indicates that the isolators 18 which separate frame 14 from baseplate 16 have significant leakage and that the prior assumption that the frame contribution to the computed ground force is negligible is incorrect. At step 600, therefore, the computed ground force is redetermined according to Equation (1) such that the computed ground force is a weighted sum of the baseplate, reaction mass and frame. Having redetermined the computed ground force for each phaselock, a return to step 500 for correlation of the redetermined ground force for each phaselock with the corresponding recorded phaselocked vibrative data is performed.

Turning next to FIGS. 4-11, the results of data acquisition and analysis in accordance with the teachings of the present invention are now set forth in detail. Downhole and surface seismic data was acquired using a Model 26 with Pelton Advance I Model 4 and GUS-1000 data acquisition system. Downhole seismic data was acquired by a geophone positioned at regular intervals in a borehole approximately 1,000 feet deep by generating vibrative seismic on the surface using different phaselocks. The phaselocked vibrative source was positioned approximately 13 feet from the borehole. Simultaneous with the acquisition of downhole data, surface data was also acquired by a surface spread comprising 48 geophone groups spaced at intervals of approximately 6 feet, each group including six bunched geophones. The first geophone group of the surface spread was positioned approximately 200 feet from the borehole. During the simultaneous acquisition of downhole and surface data, data related to the accelerations of the baseplate, reaction mass, and frame are provided by accelerometers 17a, 17b and 17c, respectively, and recorded by the same recording means as the downhole and surface data.

Turning next to FIGS. 4a-h, the autocorrelation and power spectra of the filtered pilot sweep (FPS), baseplate (BP), reaction mass (RM) and computed ground force (CGF) during the generation of ground force (GF) phaselocked vibrative energy are illustrated. While the source signature and filtered pilot sweep are separate and distinct signals, a properly determined source signature should have the same power spectral characteristics and be in phase with the FPS. A comparison of FIGS. 4a-b with FIGS. 4c-h clearly illustrate that the CGF in GF phaselock mode provides the best approximation of the FPS, and therefore, the desired power spectrum of the source signature.

Turning next to FIGS. 5a-h, the autocorrelation and power spectra of the filtered pilot sweep (FPS), baseplate (BP), reaction mass (RM) and computed ground force (CGF) during the generation of baseplate (BP) phaselocked vibrative energy are illustrated. Again, it may be clearly seen that the CGF most closely approximates the power spectrum and phase of the FPS.

In spite of the common characteristics of power spectra and phase, the CGF should and the FPS should not be used to determine the source signature. Depending on the surface conditions, the phase and amplitude of the reaction mass and baseplate accelerations are expected to vary. For this reason, if the phase of the source signature, CGF and FPS are compared, variations will appear for different types of ground surfaces.

Therefore, if the FPS is used for correlating the seismic data, an incorrect imaging of the subsurface will result. Furthermore, wavelet changes will not be reliable, thereby leading to incorrect conclusions during interpretation of the subsurface data. For example, in FIGS. 6a–d, the ratio of power spectra and phase difference of the FPS and the CGF during the generation of ground force and baseplate phaselocked vibrative energy, respectively, are illustrated. In GF phaselock, the phase difference between the FPS and the CGF is linear. In BP phaselock, the phase difference is nonlinear. As linear phase compensation circuitry is better suited to compensate for linear phase change rather than nonlinear phase change, improved results would be produced utilizing the CGF rather than the FPS.

Figure 7:
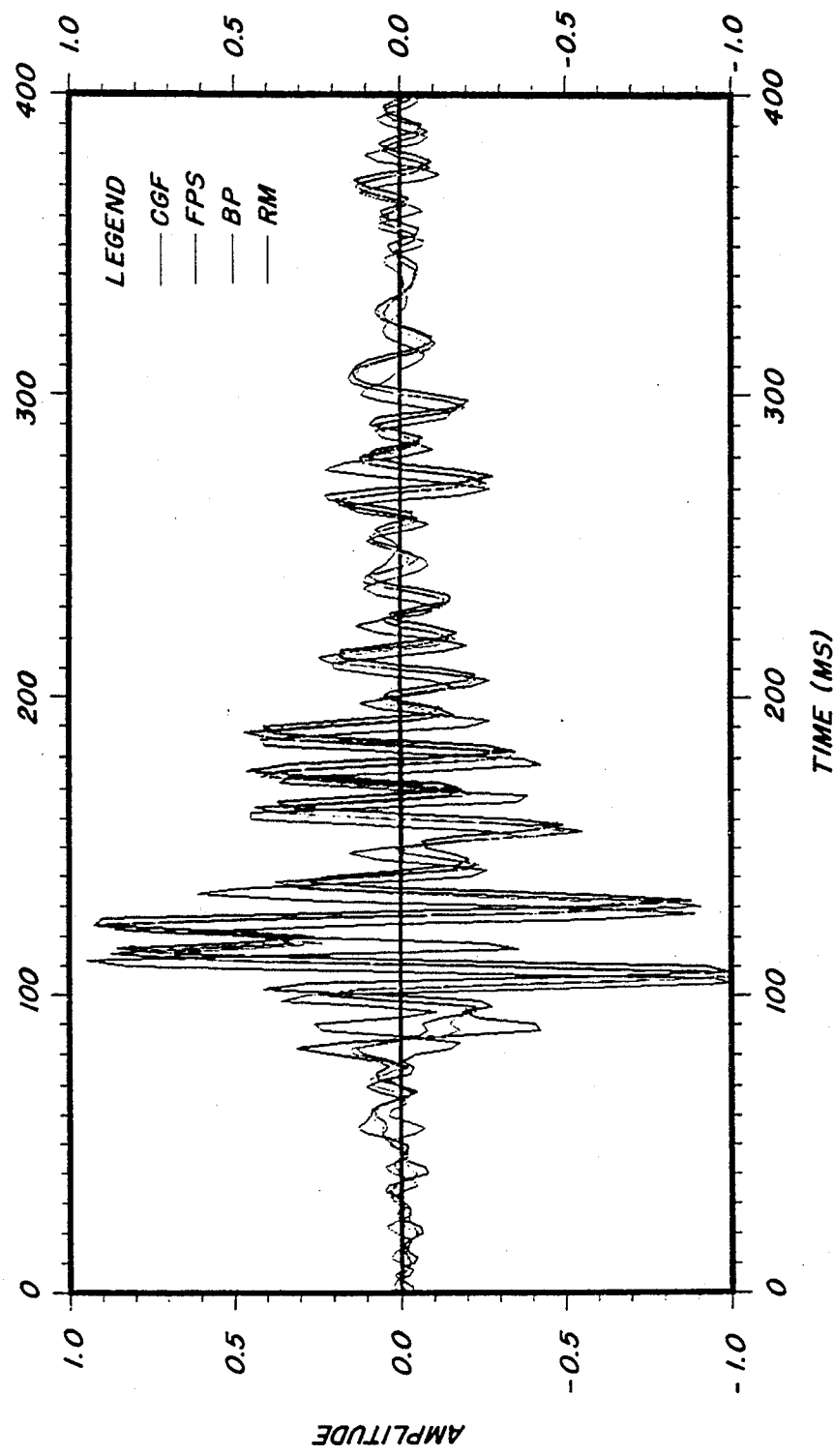
FIG. 7 illustrates the correlation of downhole data obtained by generating ground force phaselocked vibrative energy with a series of possible source signatures.

Turning next to FIG. 7, the correlation of downhole data obtained by generating ground force phaselocked vibrative energy with a series of possible source signatures are illustrated. Here, the acquired downhole data is separately correlated with the CGF, FPS, BP and RM to produce images of the subsurface. As expected, there is no agreement in either the amplitude or phase of the produced images. The imaging of the earth's subsurface, which if accurately produced would not change, is presented in different forms.

Figure 8:
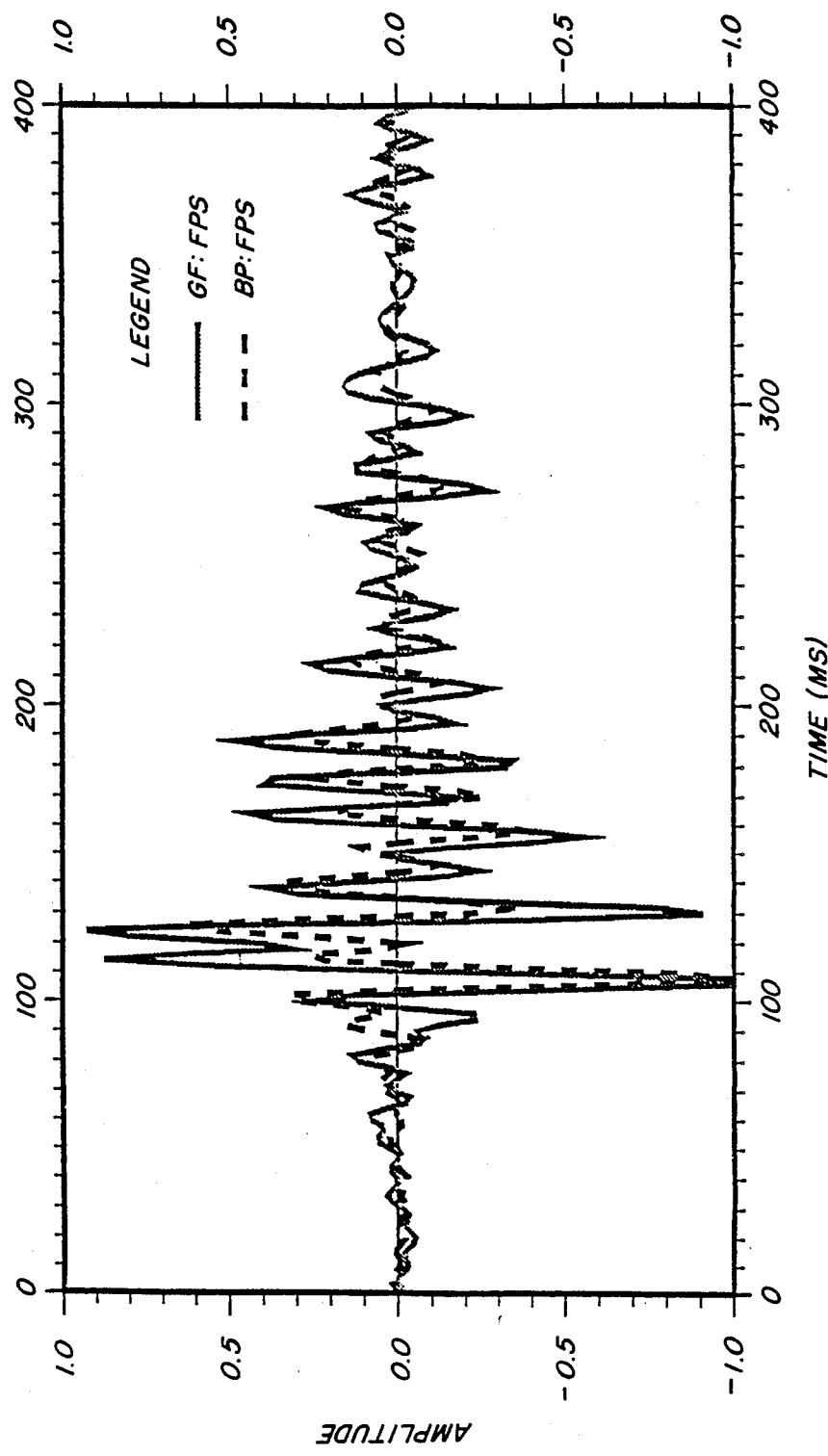
FIG. 8 illustrates the correlation of downhole data obtained by generating ground force and baseplate phaselocked vibrative energy, respectively, with the filtered pilot sweep.
Figure 9:
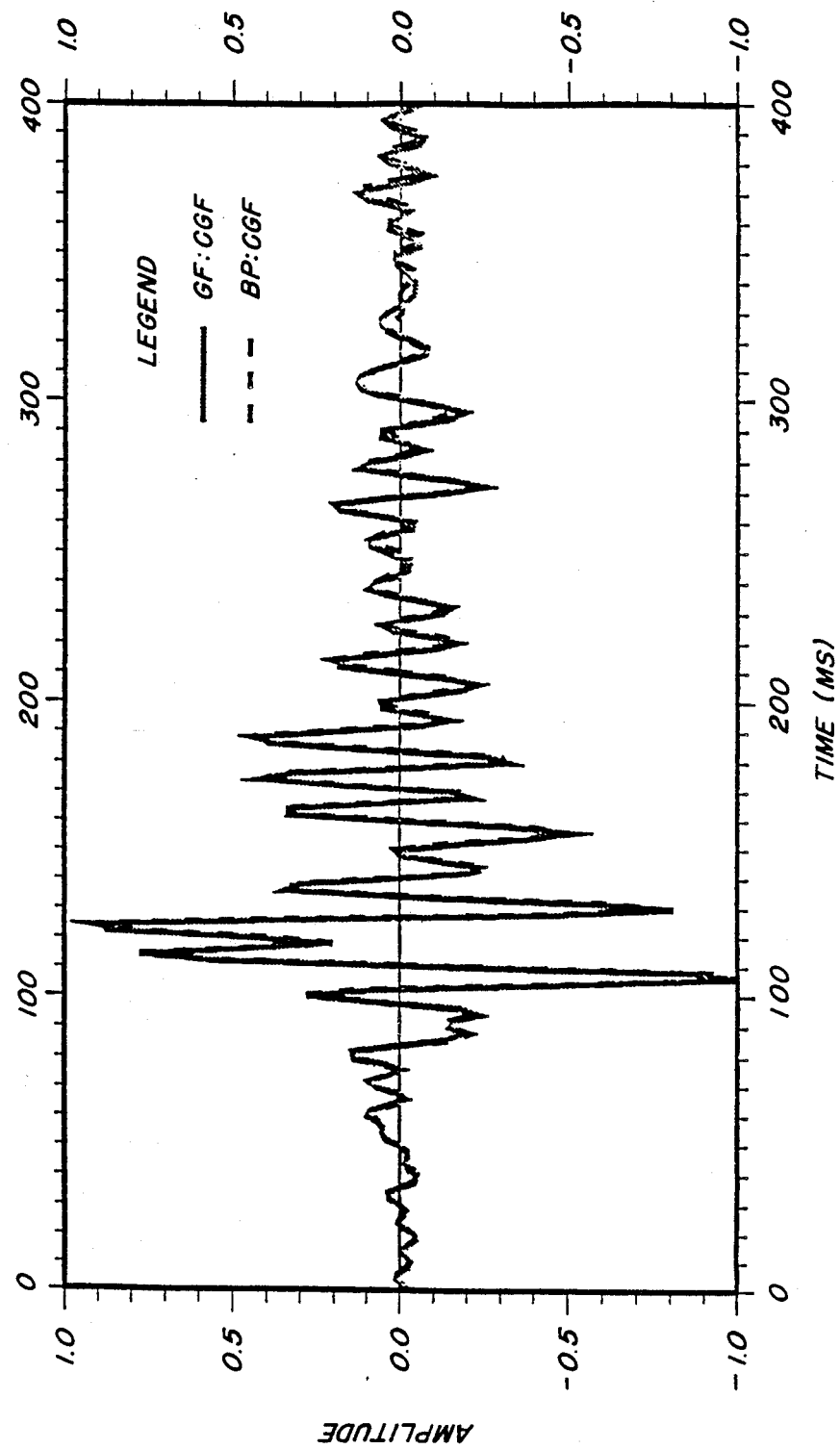
FIG. 9 illustrates the correlation of downhole data obtained by generating ground force and baseplate phaselocked vibrative energy, respectively, with the computed ground force.

Turning next to FIG. 8, the correlation of downhole data obtained by generating ground force and baseplate phaselocked vibrative energy, respectively, with the FPS are illustrated. Again, different imaging of the earth is obtained. In comparison, FIG. 9 illustrates the correlation of the same downhole data (GF and BP vibrative energy) with their respective CGFs. In contrast with FIG. 8, the agreement between the correlation of the GF phaselocked data and the correlation of the BP phaselocked data is excellent.

Figure 10A:
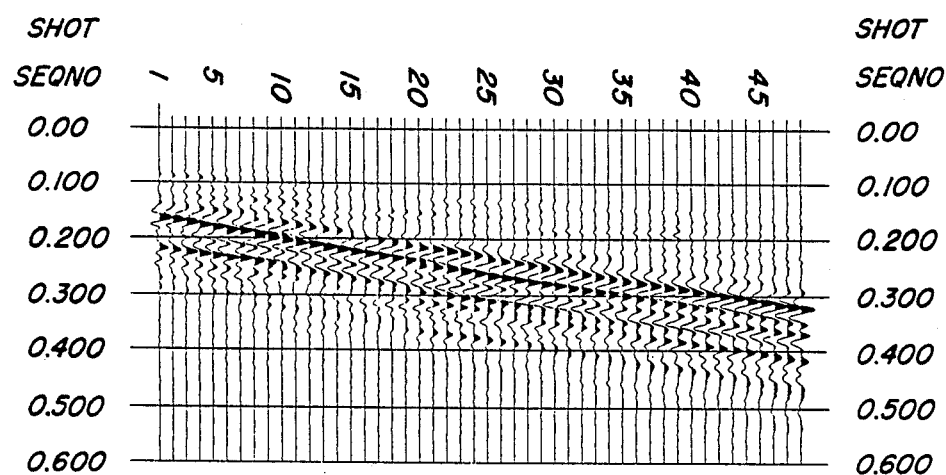
FIG. 10a illustrates the correlation of surface data acquired by generating ground force phaselocked vibrative energy and the filtered pilot sweep.
Figure 10B:
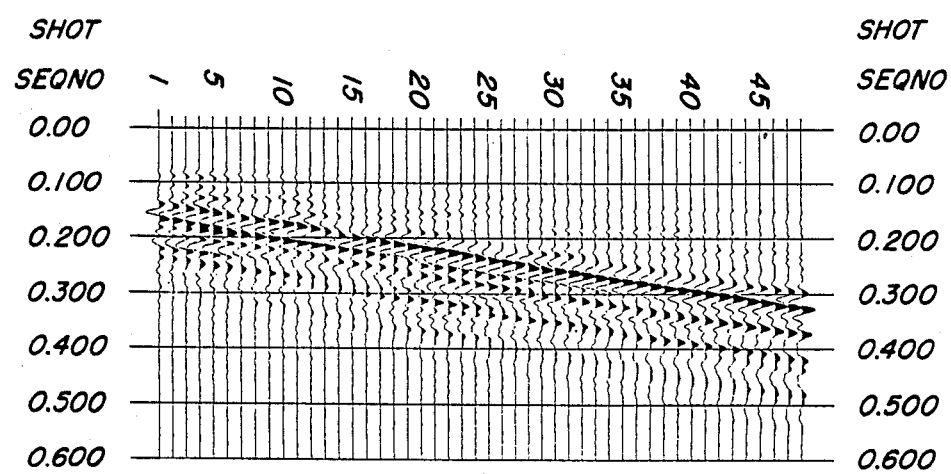
FIG. 10b illustrates the correlation of surface data acquired by generating baseplate phaselocked vibrative energy and the filtered pilot sweep.
Figure 11A:
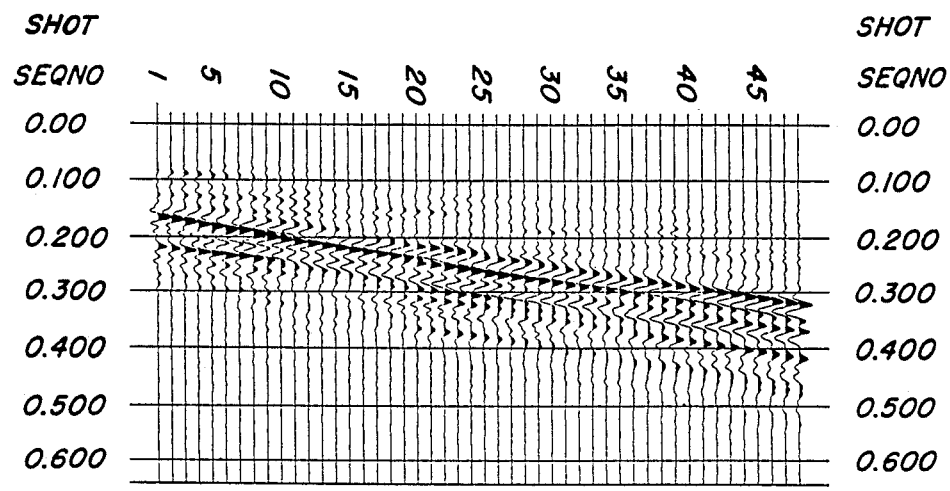
FIG. 11a illustrates the correlation of surface data acquired by generating ground force phaselocked vibrative energy and the computed ground force.
Figure 11B:
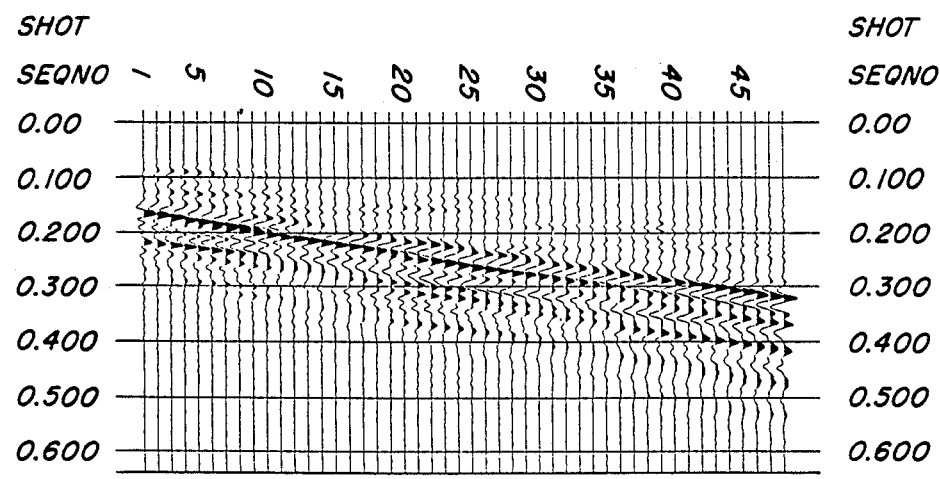
FIG. 11b illustrates the correlation of surface data acquired by generating baseplate phaselocked vibrative energy and the computed ground force.

Turning next to FIGS. 10a–b, the correlation of surface data acquired by generating ground force and baseplate phaselocked vibrative energy, respectively, and their respective FPSs are illustrated. Again, two different representations of the earth are illustrated. In comparison, however, FIGS. 11a–b illustrate the agreement between images of the subsurface when the GF and BP phaselocked data are correlated with their respective CGFs.

The results described herein are consistent with the theoretical work of Miller and Pursey, "The Field and Radiation Impedance of Mechanical Radiators on the Free Surface of a Semiinfinite Isotropic Solid", *Proc. Rov. Soc. (London)*, Ser. A, 223, pp. 521-541 and discussed by J. J. Sallas, op. cit.

Thus, there has been described and illustrated here in a method and apparatus for processing phaselocked vibrative seismic data to provide useful information regarding the characteristics of the subsurface. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed is:

1. In seismic exploration wherein a vibratory seismic source locked at a first one of baseplate phaselock, reaction mass phase lock or ground force phase lock generates vibrative energy into the ground and the amplitude and phase of reflections of said first generated phaselocked vibrative energy is detected and recorded to produce a first set of seismic data and a vibratory source locked at a second one of baseplate phaselock, reaction mass phaselock or ground force phaselock generates vibrative energy into the ground and the amplitude and phase of reflections of said second generated phaselocked vibrative energy is detected and recorded to produce a second set of seismic data, a method of processing said first and second sets of produced seismic data comprising the steps of:

determining a first computed ground force on the earth during said first generation of vibrative energy;

correlating said first computed ground force with said first set of produced seismic data to produce a first zero phase wavelet imaging the subsurface;

determining a second computed ground force on the earth during said second generation of vibrative energy;

correlating said second computed ground force with said second set of produced seismic data to produce a second zero phase wavelet imaging the subsurface; and comparing said first and second produced zero phase wavelets to determined if correct imaging of the subsurface has been produced.

2. The method according to claim 1 further comprising the steps of:

determining baseplate mass and reaction mass for said vibratory source;

measuring baseplate and reaction mass acceleration during generation of said first phaselocked vibrative energy;

measuring baseplate and reaction mass acceleration during generation of said second phaselocked vibrative energy; and determining said first and second computed ground forces on the earth according to the following relationship:

$$CGF = -(m_{BP} x_{BP} + m_{RM} x_{RM})$$

where:
$m_{BP}$ = baseplate mass;
$x_{BP}$ = baseplate acceleration;
$m_{RM}$ = reaction mass; and
$x_{BP}$ = reaction mass acceleration.

3. The method according to claim 2 wherein said first and second zero phase wavelets imaging the subsurface are produced by correlating the recorded seismic data with the product of baseplate mass and acceleration and the product of reaction mass and acceleration to said produced seismic data.

4. The method according to claim 1 wherein the step of comparing said first and second produced zero phase wavelets to determine if correct imaging of the subsurface has been produced further comprise the step of determining the said imaging of the subsurface is incorrect if said first and second produced zero phase wavelets differ from each other.

5. The method according to claim 4 further comprising the steps of:

redetermining said first and second computed ground forces;

correlating said first redetermined computed ground force and said first data set; and correlating said second redetermined computed ground force and said second data set.

6. The method according to claim 4 further comprising the steps of:

determining baseplate mass, reaction mass and frame mass for said vibratory source;

measuring baseplate, reaction mass and frame acceleration during generation of said first phaselocked vibrative energy;

measuring baseplate, reaction mass and frame acceleration during generation of said second phase-locked vibrative energy; and determining said first and second computed ground forces on the earth according to the following relationship:

$$CGF = -(m_{BP}x_{BP} + m_{RM}x_{RM} + m_{FR}x_{FR})$$

where:
$m_{BP}$ = baseplate mass;
$x_{BP}$ = baseplate acceleration;
$m_{RM}$ = reaction mass;
$x_{BP}$ = reaction mass acceleration;
$m_{FR}$ = frame mass; and
$x_{FR}$ = frame acceleration.

* * * * *